(12) United States Patent
Müller et al.

(10) Patent No.: US 8,317,225 B2
(45) Date of Patent: Nov. 27, 2012

(54) SEMI-TRAILER LANDING GEAR

(75) Inventors: Gerald Müller, Obertshausen (DE); Günter Seidel, Riedstadt (DE); José Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 385 days.

(21) Appl. No.: 11/989,145

(22) PCT Filed: Jul. 20, 2006

(86) PCT No.: PCT/EP2006/007144
§ 371 (c)(1),
(2), (4) Date: Jan. 22, 2008

(87) PCT Pub. No.: WO2007/012425
PCT Pub. Date: Feb. 1, 2007

(65) Prior Publication Data
US 2009/0152855 A1    Jun. 18, 2009

(30) Foreign Application Priority Data
Jul. 23, 2005 (DE) .......................... 10 2005 034 553

(51) Int. Cl.
*B60S 9/02* (2006.01)
(52) U.S. Cl. .................... 280/763.1; 280/6.155; 254/419
(58) Field of Classification Search .................. 280/762, 280/763.1, 293, 475, 765.1, 6.153, 766.1
See application file for complete search history.

(56) References Cited

U.S. PATENT DOCUMENTS

| | | | | |
|---|---|---|---|---|
| 3,529,850 | A | * | 9/1970 | Montalto .................... 280/763.1 |
| 3,695,631 | A | * | 10/1972 | Schwaiger ..................... 280/507 |
| 3,921,958 | A | * | 11/1975 | Brockelsby et al. ........... 254/420 |
| D269,420 | S | * | 6/1983 | McClure, Jr. ................ D12/106 |
| 5,497,969 | A | * | 3/1996 | Broughton ..................... 248/352 |
| 5,730,455 | A | * | 3/1998 | Varnum et al. ................ 280/475 |
| 6,598,886 | B2 | * | 7/2003 | Baird et al. ................. 280/6.155 |
| 2001/0020781 | A1 | | 9/2001 | Vandenberg et al. |

FOREIGN PATENT DOCUMENTS

| | | |
|---|---|---|
| DE | 100 07 496 C1 | 4/2001 |
| EP | 0 380 941 A2 | 8/1990 |
| EP | 0 972 689 A2 | 1/2000 |
| EP | 1 104 369 B1 | 1/2003 |
| JP | 2004255891 | * 9/2004 |

* cited by examiner

*Primary Examiner* — J. Allen Shriver, II
*Assistant Examiner* — Bridget Avery
(74) *Attorney, Agent, or Firm* — Hudak, Shunk & Farine Co. LPA

(57) ABSTRACT

A semi-trailer landing gear, in particular to support trailers, with a support element which includes an outer sleeve and an inner sleeve and which can be displaced in a telescopic manner in relation to the height. The outer sleeve includes a securing flange which can be applied to a vehicle. The aim of the invention is to develop a semi-trailer landing gear which is economical to produce and can also withstand high loads. The aim is achieved by virtue of the fact that the outer sleeve and the securing flange are made of a single piece of flat steel by edge rolling.

24 Claims, 2 Drawing Sheets

SEMI-TRAILER LANDING GEAR

FIELD OF INVENTION

The invention concerns a support jack, especially for propping up trailers, with a vertically telescopic support element having an outer sleeve and an inner sleeve, while the outer sleeve has a fastening flange for placement on a vehicle.

BACKGROUND OF THE INVENTION

Such support jacks are used in particular to prop up the trailers of a tractor-trailer rig. These support jacks are made from rectangular tubes, placed one inside the other and able to move relative to each other, as is known for example from EP 1 104 369 B1.

To reduce the weight and the manufacturing expenses, a lifting mechanism with shaft tube and support tube is proposed in EP 0 972 688 A2, being fastened to a vehicle chassis by a mounting mechanism. The mounting mechanism should be configured as a mounting plate, closing an open U-shaped profile element, so that a hollow shaft tube is produced. For this, the mounting plate is welded to the U-profile by longitudinal welds for its entire length. The major drawback of this known lifting mechanism is the expensive fabrication, since the U-shaped profile element has to be welded to the mounting plate with very precise fit. Furthermore, there is the risk of a cross section of different clearance when there are welds situated on the inside, and this may cause hindrance in the extending and retracting of the support tube.

Another prior art is EP 0 380 941 A2. In the case of this support device, an outer sleeve is extruded as a single piece with its fastening plate for mounting the support device onto a vehicle. Since the rough casting is in block form, this method is confined to light metals, especially aluminum. But such support devices have not been successful on the market, since they are costly because of the high-value material and they have proven to be prone to breakdown in operational use, due to the low material strength.

SUMMARY OF THE INVENTION

Consequently, the problem of the invention is to develop support jacks which on the one hand are economical to fabricate and on the other hand also withstand high loads.

This problem is solved by a support jack in which the outer sleeve and the fastening flange are fabricated as a single piece by means of edge rolling from a piece of flat steel. In most cases, cold working is done; only in special instances, with large cross sections or very small bending radius, is the material heated in order to reduce the forces needed for the shaping. The major benefit of edge-rolled as opposed to extruded sleeves lies in the almost free choice of the alloy for the platelike starting material. Conventional steel grades can also be used for this. Furthermore, it is not necessary to connect individual structural parts by a plurality of welded seams, which are difficult to fabricate. Thanks to the relatively short bending process of the material, very large numbers of pieces can be produced per unit of time.

In one particular embodiment, each sleeve has at most one welded seam. This type of material joint produces sleeves with a self-contained hollow body, which has a high bending strength. The welded seam can be located in a position very favorable to the fabrication, for example, on the side wall close to the fastening flange.

It has been found to be especially advantageous when the connection weld is arranged in the axial direction of the outer sleeve. The welded seam can then run down the middle through one side wall of the sleeve or in the angle between two neighboring side walls Preferably, the fastening flange projects beyond the outer sleeve at either end. In any case, in this embodiment as well the fastening flange forms part of the sleeve as a single piece. The fastening flange has a given pattern of holes. For the mounting on a vehicle chassis, for example, screws are then inserted through the holes and bolted to the vehicle.

The fastening flange of the outer sleeve can be formed by a wall folded outward from the respective side wall by around 90 degrees, on whose end segment a 180 degree bend-around is preferably arranged. This results in a double wall thickness in the region of the fastening flange with especially good resistance to high surface pressures. The wall thickness resulting from the bend-around at the vehicle side should meet the complementary opposite wall segment in the middle between side walls of the outer sleeve and is advantageously butt-welded to it.

Advantageously, the sleeve in the region of the bend-around has a cavity seal. Due to the sharp bend-around, microcracks are formed on the outside and a cavity is formed on the inside, in which moisture can penetrate and result in rust formation. Such corrosion effects are effectively prevented by a suitable cavity seal in the entire region of the fastening flange. This likewise substantially increases the lifetime of the support jack.

An especially high stability of the support jack is achieved when two opposite side walls of the outer sleeve have an angled wall section. Preferably, the side walls bordering on the fastening flange are each angled by 5 to 30 degrees. The angling starting at the fastening flange should not go beyond half the depth of the profile and it should widen in the direction of the fastening flange.

BRIEF DESCRIPTION OF THE DRAWINGS

For a better understanding, the invention will now be explained more closely by means of 3 drawings. These show.

DETAILED DESCRIPTION OF THE INVENTION

Figure 1:
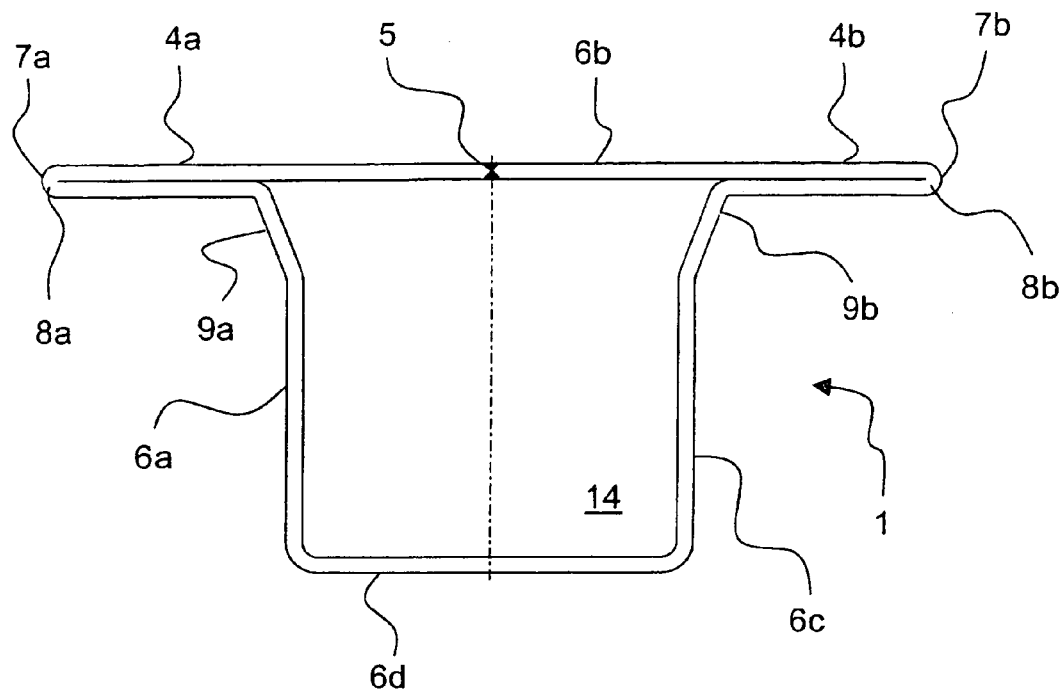
FIG. 1: a plan view of an outer sleeve with flat-rolled bend-around of a fastening flange.

FIG. 1 shows in a plan view an outer sleeve 1 according to the invention, whose side walls 6a, 6b, 6c, 6d surround a basically rectangular inner space 14. The side wall 6b has a connection weld 5 in its axis of symmetry, which joins together both halves of the side wall 6b. At the side wall 6b, the entire support jack is placed via the outer sleeve 1 onto a vehicle, not shown. For this, fastening flanges 4a, 4b projecting laterally beyond the side walls 6a, 6c are formed on the side wall 6b on either side of the connection weld 5.

The side walls 6a, 6b, 6c, 6d are formed from an originally platelike starting material by bending and consequently pass into each other without seams. At each end segment 7a, 7b of the fastening flanges 4a, 4b one notices a bend-around 8a, 8b, where the material is bent by 180 degrees. In the embodiment shown in FIG. 1, this is a sharp bend-around, which has been rolled again after the bending process, so that the wall material in the region of the bend-around again lies against each other.

Figure 3:
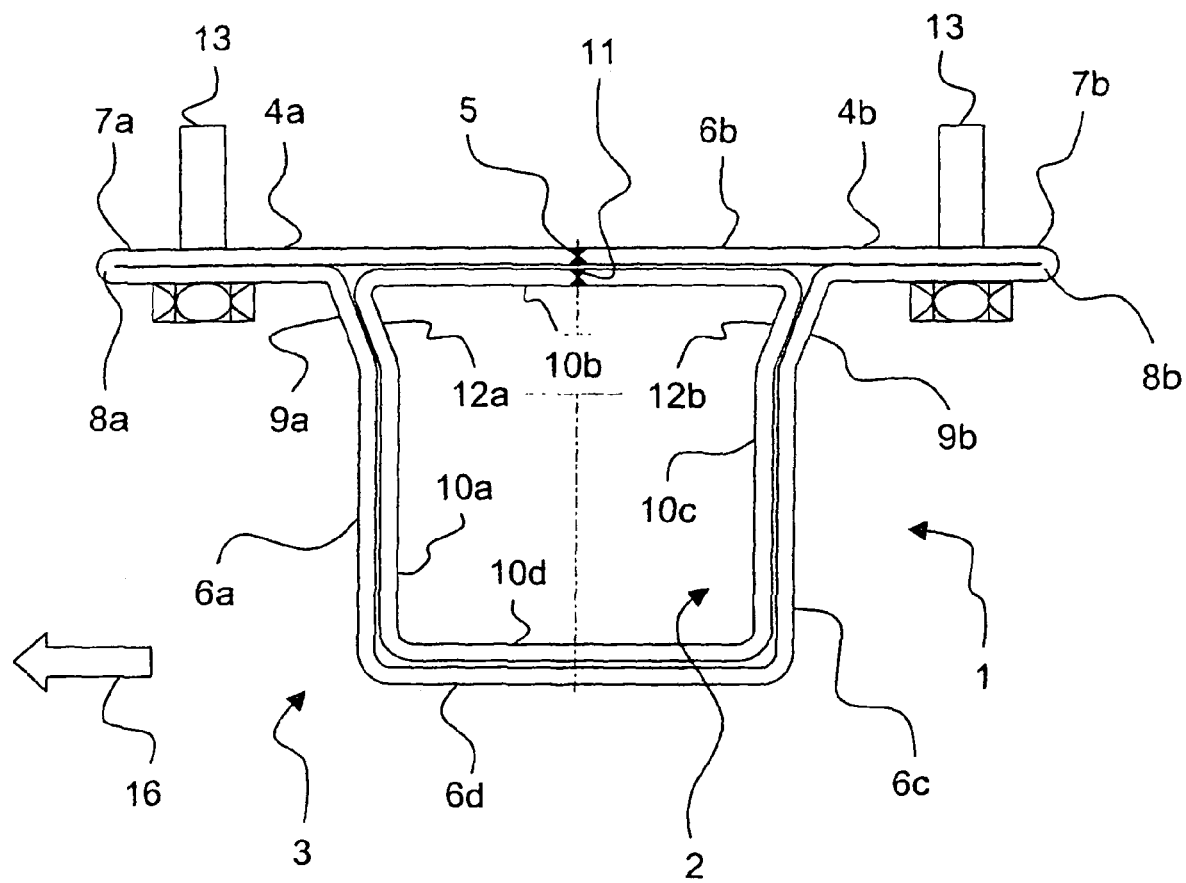
FIG. 3: a plan view of an outer sleeve with inner sleeve arranged therein.

In the usual installation procedure, the side walls 6a, 6c are at right angles to the direction of travel 13 and the side walls 6b, 6d lie in this direction (see FIG. 3). To increase the stability, the opposite side walls 6a, 6c are provided with angled wall sections 9a, 9b, which are set outward by around 20 degrees in the direction of the side wall 6b. Thanks to this structural measure, it is possible to have thinner material for the outer sleeve 1 with the same stability. The side walls 6a, 6c are formed with the angled wall section because of the forces acting upon the trailer when coupling it in or against the direction of travel 16.

Figure 2:
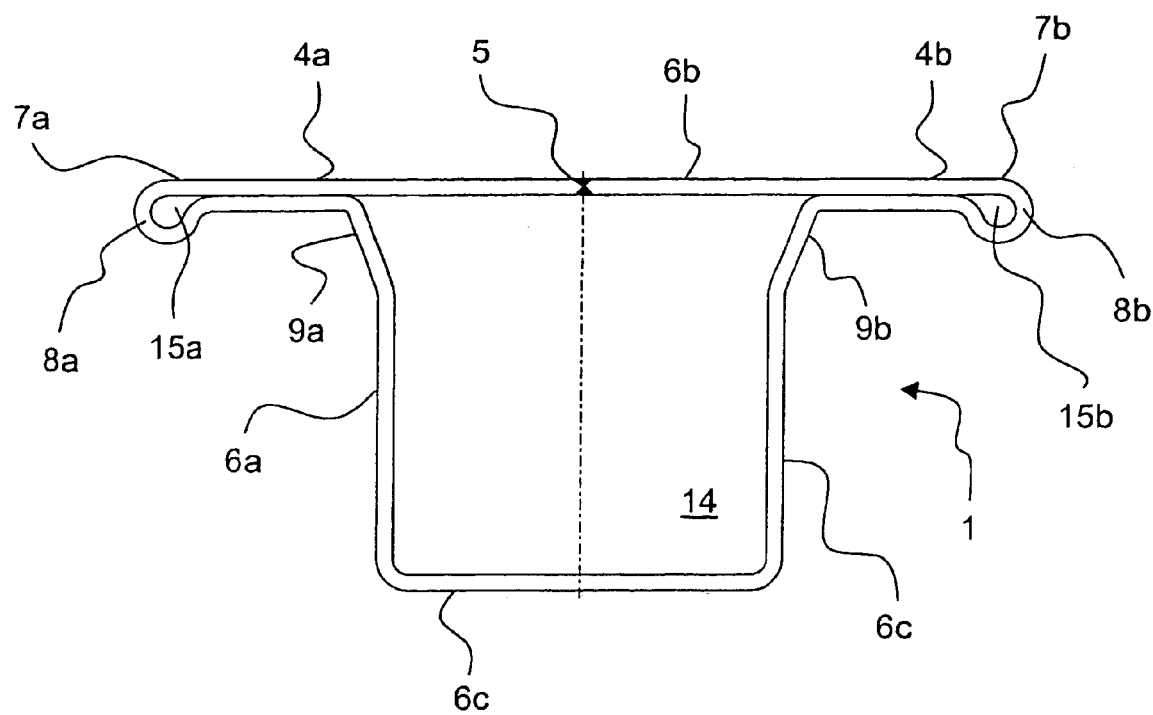
FIG. 2: a view per FIG. 1 with moderately rolled bend-around of a fastening flange.

An alternative embodiment in respect of its end segments 7a, 7b is shown in FIG. 2. This embodiment has a 180-degree bend-around, but one which has not been completely rolled flat, so that a loop space 15a, 15b remains. This results in fewer microcracks on the outer side of the bend-around 8a, 8b, since the material in this region is not subject to such intense strain as in the embodiment per FIG. 1.

FIG. 3 shows a plan view of a support element 3 comprising an outer sleeve 1 and an inner sleeve 2 inserted therein. For the fastening onto a vehicle (not shown), fastening bolts 13 are inserted into boreholes, also not visible in the plan view. The fastening bolts 13 project out beyond the plane surface of the side wall 6b with its fastening flanges 4a, 4b.

The inner sleeve 2 was likewise formed from a platelike starting material by edge rolling and joined into a closed hollow body by the connection weld 11. The connection weld 11 is likewise situated in the axis of symmetry and is arranged immediately next to the connection weld 5.

The inner sleeve 2 is formed as a rectangular tube with two pairs of opposite side walls 10a, 10b, 10c, 10d of equal length, the side walls 10a, 10c having angled wall sections 12a, 12b complementary to the side walls 6a, 6c. As a result of this, on the one hand, the maximum withstandable flexural torque is increased and on the other hand a good axial guidance is provided for the inner sleeve 2 relative to the outer sleeve 1.

LIST OF REFERENCE SYMBOLS 1 outer sleeve
2 inner sleeve
3 support element
4a, 4b fastening flange
5 connection weld, outer sleeve
6a-d side wall, outer sleeve
7a, 7b end segment, fastening flange
8a, 8b bend-around
9a, 9b angled wall section, outer sleeve
10a-d side wall, inner sleeve
11 connection weld, inner sleeve
12a, 12b angled wall section, inner sleeve
13 fastening bolt
14 innerspace
15 loop space
16 direction of travel

What is claimed is:

1. A support jack, comprising: a vertically telescopic support element having an outer sleeve formed as a hollow body and an inner sleeve, wherein the outer sleeve has a fastening flange for placement on a vehicle, wherein the outer sleeve and the fastening flange consist of a single piece fabricated by edge rolling from a piece of flat steel, and wherein the entire fastening flange has a double wall thickness of one side wall.

2. The support jack per claim 1, wherein the outer sleeve has a single connection weld seam.

3. The support jack per claim 1, wherein the fastening flange projects beyond the outer sleeve at either end.

4. The support jack per claim 1, wherein the fastening flange has an end segment with a 180° bend-around.

5. The support jack per claim 1, wherein two opposite side walls of the outer sleeve have an angled wall section.

6. The support jack per claim 2, wherein the connection weld runs in the axial direction of the outer sleeve.

7. The support jack per claim 4, wherein the outer sleeve in the region of the bend-around has a cavity seal.

8. The support jack per claim 6, wherein the fastening flange projects beyond the outer sleeve at either end.

9. The support jack per claim 8, wherein the fastening flange has a double wall thickness of one side wall.

10. The support jack per claim 9, wherein the fastening flange has an end segment with a 180° bend-around.

11. The support jack per claim 10, wherein the outer sleeve in the region of the bend-around has a cavity seal.

12. The support jack per claim 11, wherein two opposite side walls of the outer sleeve have an angled wall section.

13. A support jack, comprising: a vertically telescopic support element having an outer sleeve formed as a hollow body and an inner sleeve, wherein the outer sleeve has a fastening flange for placement on a vehicle, wherein the outer sleeve and the fastening flange are fabricated as a single piece by edge rolling from a piece of flat steel, and wherein the outer sleeve has a single connection weld seam through one side wall or in the angle between two neighboring side walls.

14. The support jack per claim 13, wherein the connection weld runs in the axial direction of the outer sleeve.

15. The support jack per claim 13, wherein the fastening flange projects beyond the outer sleeve at either end.

16. The support jack per claim 13, wherein the fastening flange has an end segment with a 180° bend-around, and wherein the outer sleeve in the region of the bend-around has a cavity seal.

17. The support jack per claim 13, wherein two opposite side walls of the outer sleeve have an angled wall section.

18. The support jack per claim 14, wherein the fastening flange projects beyond the outer sleeve at either end.

19. The support jack per claim 18, wherein the fastening flange has a double wall thickness of one side wall, wherein the fastening flange has an end segment with a 180° bend-around, wherein the outer sleeve in the region of the bend-around has a cavity seal, and wherein two opposite side walls of the outer sleeve have an angled wall section.

20. A support jack, comprising: a vertically telescopic support element having an outer sleeve formed as a hollow body and an inner sleeve, wherein the outer sleeve has a fastening flange for placement on a vehicle, wherein the outer sleeve and the fastening flange are fabricated as a single piece by edge rolling from a piece of flat steel, and wherein the outer sleeve has a single weld connection seam.

21. A support jack, comprising: a vertically telescopic support element having an outer sleeve and an inner sleeve, wherein the outer sleeve is formed as a hollow body surrounded by side walls and comprises at most one connection weld seam, wherein the outer sleeve has fastening flanges formed on one of the side walls for placement on a vehicle, and wherein the outer sleeve and the fastening flanges consist of a single piece fabricated by edge rolling from a piece of flat steel.

22. A support jack, comprising: a vertically telescopic support element having an outer sleeve and an inner sleeve, wherein the outer sleeve is formed as a hollow body with side walls and at most one connection weld seam being located in one of the side walls butt welded to both complementary wall segments, wherein the outer sleeve has a fastening flange for placement on a vehicle, and wherein the outer sleeve and the fastening flange consist of a single piece fabricated by edge rolling from a piece of flat steel.

23. A support jack, comprising: a vertically telescopic support element having an outer sleeve formed as a hollow body and an inner sleeve, wherein side walls of the outer sleeve surround a basically rectangular inner space, wherein one side wall has a single connection weld joining together both halves of said side wall and the outer sleeve has a fastening flange for placement on a vehicle formed on either side of the connection weld, and wherein the outer sleeve and the fastening flange consist of a single piece fabricated by edge rolling from a piece of flat steel.

24. A support jack, comprising: a vertically telescopic support element having an outer sleeve formed as a hollow body and an inner sleeve, wherein the outer sleeve comprises side walls surrounding a basically rectangular inner space and has fastening flanges for placement on a vehicle, wherein the outer sleeve and the fastening flanges consist of a single piece fabricated by edge rolling from a piece of flat steel to a self-contained hollow body comprising at most one welded seam, wherein the fastening flanges are formed on one of the side walls projecting laterally beyond adjacent side walls on either side of the connection weld and each end segment of the fastening flanges is provided with a 180° bend.

* * * * *